March 22, 1955   R. D. PIKE   2,704,702
METHOD OF COUNTERCURRENT IN-LINE BASE EXCHANGE
FOR REMOVING POTASSIUM FROM WYOMINGITE
Filed Sept. 6, 1950   2 Sheets-Sheet 1
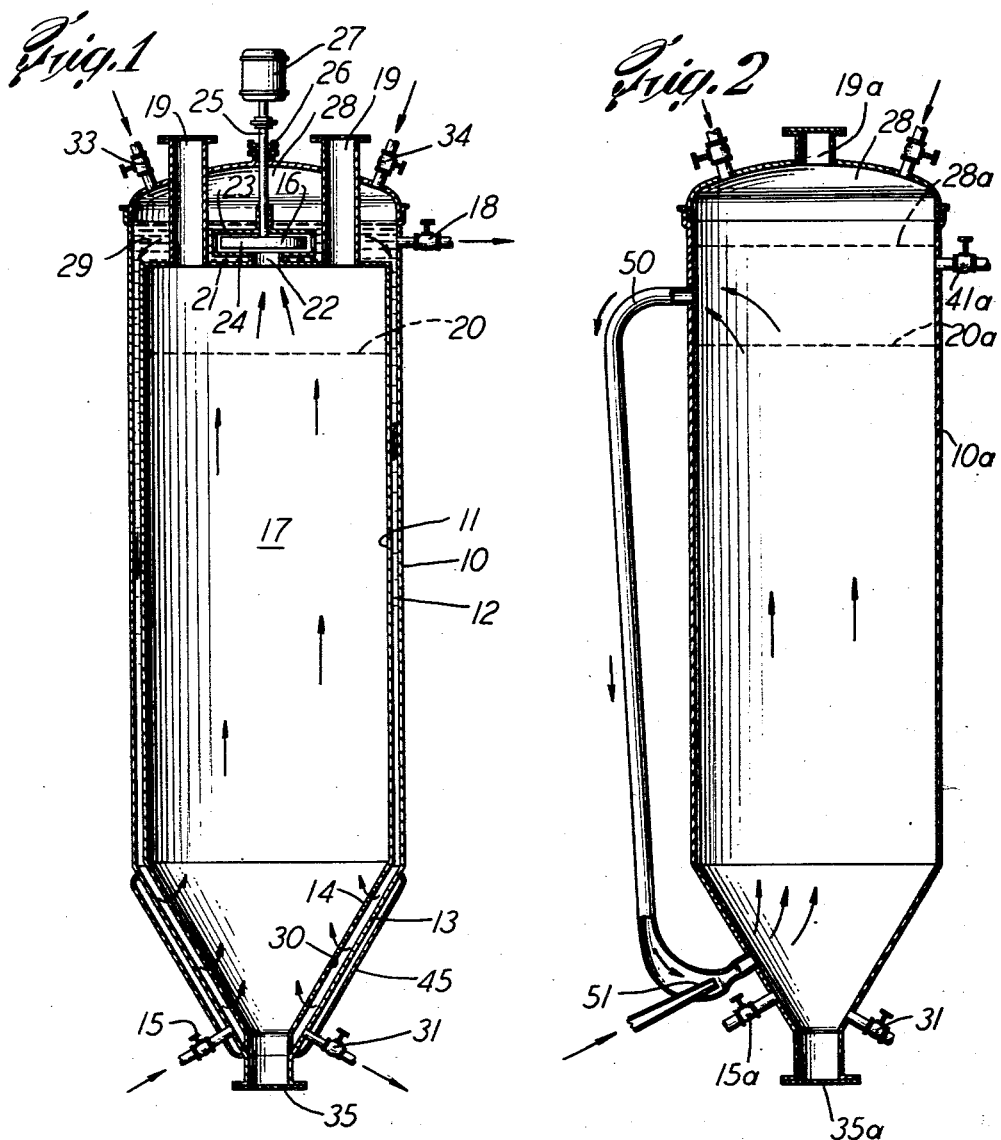
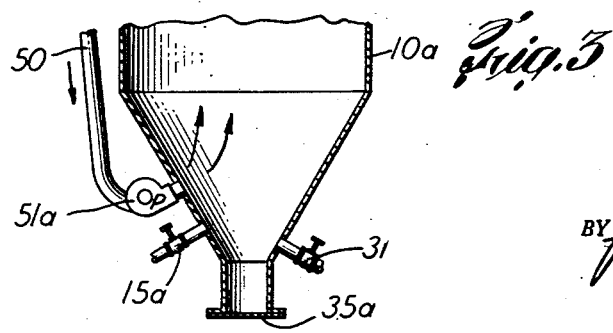
INVENTOR.
ROBERT D. PIKE
BY Pollard Johnston
ATTORNEYS March 22, 1955 R. D. PIKE 2,704,702
METHOD OF COUNTERCURRENT IN-LINE BASE EXCHANGE
FOR REMOVING POTASSIUM FROM WYOMINGITE
Filed Sept. 6, 1950 2 Sheets-Sheet 2
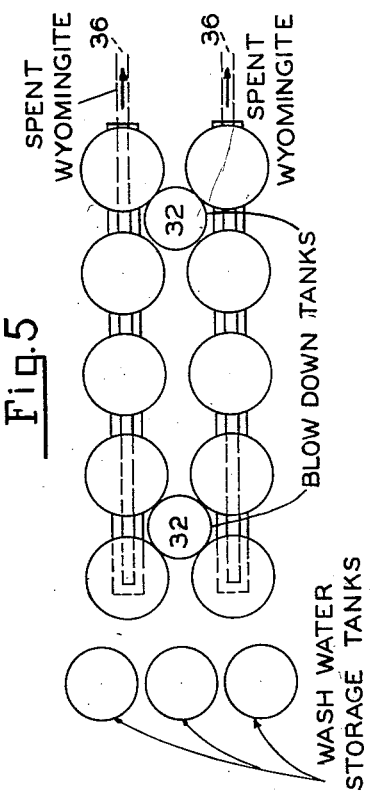
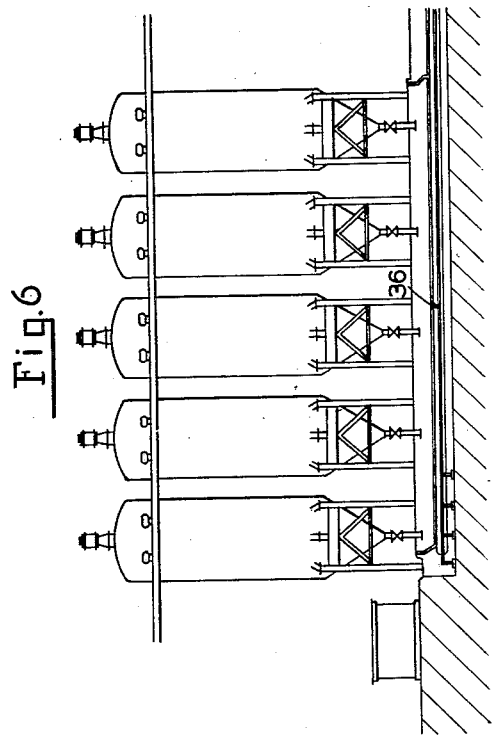
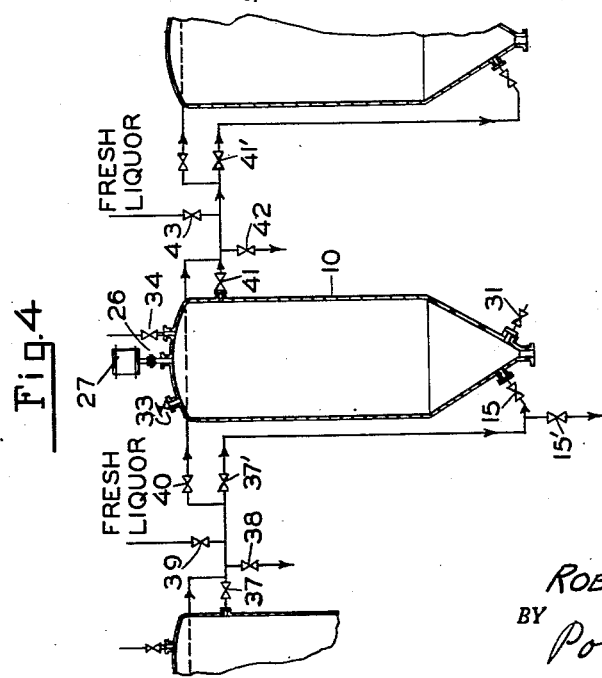
INVENTOR.
ROBERT D. PIKE
BY Pollard & Johnston
ATTORNEYS

2,704,702

METHOD OF COUNTERCURRENT IN-LINE BASE EXCHANGE FOR REMOVING POTASSIUM FROM WYOMINGITE

Robert D. Pike, Greenwich, Conn.

Application September 6, 1950, Serial No. 183,437

4 Claims. (Cl. 23—31)

This invention relates to a method and apparatus for the recovery of potassium from wyomingite by base exchange.

In my Patents Nos. 2,343,080 and 2,343,081, granted February 29, 1944, I have described and claimed a process for the recovery of potassium carbonate from wyomingite by base exchange with sodium carbonate in a single autoclaving step in which for efficient recovery of the potassium the weight ratio of sodium carbonate to potassium carbonate in the solution recovered from the autoclave should not be less than 1.8:1 and may be as hgih as 3.5:1.

In my Patent No. 2,455,190, granted November 30, 1948, I have described and claimed a process for the recovery of potassium carbonate from wyomingite by base exchange with sodium carbonate in which the weight ratio of sodium carbonate to potassium carbonate in the solution recovered from the autoclave may be as low as 0.51:1 and still secure efficient recovery of the potassium from the wyomingite.

In the method and apparatus of my present invention, I have provided a process by which potassium may be recovered from wyomingite by base exchange with sodium salts in which the weight ratio of sodium salts to potassium salts in the solution recovered from the autoclave may be still further reduced. In the use of sodium carbonate for base exchange, it is possible by my new method and apparatus to recover substantially all of the recoverable potassium and have in the solution recovered from the autoclave system a ratio of sodium carbonate to potassium carbonate of as low as 0.192:1, or in the use of sodium nitrate for the recovery of the potassium to have in the solution recovered from the autoclave system a weight ratio of 0.21:1.

As these processes are used essentially for the recovery of potassium salts from the wyomingite, a lower ratio of the sodium salt to the potassium salt in the final solution from the base exchange step means that less water will need to be evaporated to recover the potassium salts from the solution, less water will be used per ton of potassium recovered, and where a double salt is recirculated in the recovery system, less of the double salt will be in circulation.

The present invention covers a novel type and arrangement of vessels in series for carrying out countercurrent base exchange between a sodium salt and a potassium-bearing solid such as wyomingite capable of undergoing base exchange and a novel method of carrying out the base exchange steps. My invention is not limited to the type of materials used, except that a base exchange must occur between them. However, I shall cite as an example, in describing my invention, base exchange under heat corresponding to about 225 p. s. i. steam pressure between the leucitic potassium content of the mineral wyomingite and the sodium of the base exchange liquid. The latter may contain any soluble salt of sodium in solution.

Wyomingite, which is found near Superior, Wyoming, contains about 50 per cent leucite which is a potassium aluminum silicate, $K_2O Al_2O_3 4SiO_2$. Leucite has the unique property among silicate minerals containing potassium of affording base exchange with sodium, as follows:

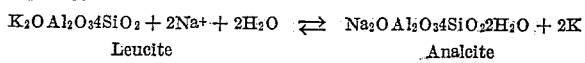

$$K_2O Al_2O_3 4SiO_2 + 2Na^+ + 2H_2O \rightleftarrows Na_2O Al_2O_3 4SiO_2 2H_2O + 2K$$

Leucite             Analcite

Wyomingite is a hard massive mineral which is ground only with difficulty. However, I have discovered that the size of the wyomingite particles has surprisingly little effect upon base exchange, and I take advantage of this fact in my present invention by carrying out base exchange by circulating the sodium bearing solution through a deep bed of the wyomingite particles, which are large enough to permit relatively free flow of the solution through the bed without substantial removal of fragments or particles of wyomingite. This permits me to operate a line or series of vessels which are switched in their relative positions in the line by the manipulation of valves, the liquor in each vessel, or stage of the series, being separated from the solids merely by flowing through under pressure and passing on to the next vessel, or stage, in the series. From the first vessel of the series, the finished liquor issues with a relatively low or impoverished content of sodium and a correspondingly high or enriched content of potassium; and into the last vessel, or stage of the series, I introduce the pure sodium salt in solution in water. I may, as shown in the examples given below, use ten vessels in a series, of which nine or less are in actual operation, or eight, of which seven or less are in operation, the nonoperating vessel or vessels being in the preparatory stage of washing, dumping the analcite containing tails, and filling with fresh wyomingite. There may be two or more nonoperating vessels of the series at any time. I may, for example, switch a vessel from one stage to another about every hour, so that the actual total net time of treatment is about nine hours, or about seven hours, according to whether nine or seven vessels are in-line.

An object of my invention is to provide a base exchange process in which the base exchange solution is circulated through a series of fixed beds of fragments in base exchange vessels, preferably with recirculation in each vessel, from the vessel containing the most spent base exchange solid to that containing the freshest base exchange solid so as to recover potassium from the base exchange solid having the highest amount of potassium with the base exchange solution having the least amount of sodium salt.

Another object of my invention is to provide an apparatus for base exchange comprising a series of base exchange vessels interconnected by valves, each vessel being capable of withstanding a pressure of about 225 p. s. i. and being heated with steam corresponding preferably to about 225 p. s. i., saturated steam pressure, and with means to circulate the base exchange solution through the base exchange solid contained within the vessels.

A further object of my invention is to fill succeeding first vessels in the line with a bed of fragments of fresh wyomingite, to treat this with oncoming liquor which has flowed through the beds in each vessel or stage of the series from last to first, producing a finished liquor relatively high in content of potassium and correspondingly low in sodium.

A further object of my invention is to provide a line of base exchange vessels filled with fragments of wyomingite with means for changing the relative position of the vessels in the line by valve manipulation, which is also used for removing one or more vessels from the line and replacing them in the line, and providing means for passing a continuous flow of base exchange liquor through the line of vessels. Independent means may be provided for increasing the rate of flow of the liquor through each vessel, so as to provide for more effective base exchange.

A further object of my invention is to provide a pumping means, externally driven, for circulating the liquor in each vessel independently of the net flow through the line.

A further object of my invention is to provide a vessel for base exchange in which liquor may be flowed through the particles at a controlled rate of flow, whereby the critical rate of flow to cause teeter equilibrium of particles of a given size without actual removal may be equalled.

Other objects and advantages of my invention will be apparent as this description proceeds.

With these and other objects in view, I shall now describe an embodiment of my invention by reference to the accompanying drawings, in which, Fig. 1 is a vertical sectional view of a base exchange vessel.

Fig. 2 is a sectional view of a modified form of base exchange.

Fig. 3 is a part sectional view of a still further modified form of base exchange vessel.

Fig. 4 is a diagram of the in-line valve arrangement.

Fig. 5 is a diagrammatic plan of a general arrangement.

Fig. 6 is a diagrammatic elevation of the general arrangement shown in Fig. 5.

In the drawing Fig. 1, 10 is a vertically disposed pressure retaining vessel capable of withstanding an internal pressure of about 225 p. s. i. Within this vessel is a cylindrical shell 11, defining an annular space 12 which is preferably about 1½" wide. I provide a truncated conical bottom 13 and an inner truncated cone 14, defining the same annular space. The inner cone is perforated so that while it supports the wyomingite, it also permits upward percolation of the flow of liquor actuated by the centrifugal pump 16 and flowing down through the annulus 12. The net flow of liquor enters through valve 15 at bottom and leaves through valve 18 at top, but as the pump 16 maintains a steady flow of recirculated liquor, it will be obvious that the net flow may be introduced into and removed from this recirculation at any suitable point. If, as shown and as is preferred, however, the net flow enters the bottom and leaves at the top of each vessel, the upward velocity through the bed of solids results from the net flow of liquor through the series plus the recirculated flow induced by the pump 16.

Openings 19 are provided to charge fresh wyomingite into an empty vessel. I ordinarily prefer to provide two or three such openings which are closed by pressure-tight covers when the vessel is on-line. The top of the charge of wyomingite is indicated at 20. The plate 21 divides the vessel into an upper and lower part, except for the opening 22, which provides the suction for centrifugal pump 16. This latter comprises housing 23 and rotor 24. The latter is driven by shaft 25 which enters through stuffing box 26, which connects with the steam filled space 28 at the top of the vessel. Motor 27 drives the centrifugal pump 16. The action of the pump creates sufficient pressure in the pool of liquid 29 to force a recirculating flow down through the annulus 12 and up through bed 17.

I ordinarily prefer to regulate the upward velocity through bed 17 in relation to the size of particles, at such a rate that the bed remains quiescent and has about 45 per cent voids, but I may use smaller particles of wyomingite, or higher velocities, so that a so-called teeter equilibrium is established and the voids are increased to about 60 per cent. In any event, the liquor issues from the top of the bed 17 at such a low velocity in relation to the minimum size of particles, that little, if any, of the wyomingite is carried to the suction of the centrifugal pump. Whatever small amount may be so carried, however, will eventually collect in the bottom of the truncated annulus 30 and may be occasionally flushed out through valve 31, which has a connection, not shown, to the closed blow-down tanks 32.

When it is desired to drain out the sodium base exchange liquor, prior to dumping, which is the preferable practice when operating with beds of larger particles which permit easy drainage, valves 15 and 31 may be opened, permitting flow to a covered blow-down tank 32 and steam pressure may be applied at 33. When the bed has been drained, wash water may be entered at 34, and this also blown down with steam, or compressed air, through valves 15 and 31. Thus most of the sodium values in the base exchange liquor may be recovered before dumping the charge, which is done by removing cover 35. The analcite tails may be dropped onto belt 36 (Fig. 6) and removed from the system.

If, as in Example 2 below, I operate with smaller particles of wyomingite, which offer resistance to the downward percolations of liquor, I prefer to dump the entire charge through 35 and to separate the recoverable sodium containing liquor from the analcite tails, by usual well-known means, such as for example, washing and filtration.

Heat may be furnished by steam jacket 45, or by injecting steam through valve 33, or other suitable point, so as to maintain a temperature corresponding to a pressure of about 225 p. s. i. within the last vessel. This pressure becomes reduced slightly in going through the line from last to first vessel, corresponding to the friction in passing through the connecting pipes. The energy for causing flow through the bed as pointed out below is supplied by the pump 16.

In the embodiment of pressure retaining vessel illustrated in Fig. 2, 10a indicates a vertically disposed pressure retaining vessel capable of withstanding an internal pressure of about 225 pounds per square inch. A charging opening is provided at 19a and a discharge opening is provided at 35a, suitable caps being provided to close these openings when the vessel 10a is in use for base exchange.

The net flow of base exchange solution enters at 15a and leaves the vessel 10a at 41a. The approximate level of the wyomingite in the vessel is indicated at 20a and the approximate level of the base exchange solution is indicated at 28a, the steam filled space at the top of the vessel is indicated at 28.

In order to provide recirculation of the base exchange solution through the vessel 10a, one or more pipes 50 may be connected to the top of the vessel below the level of the base exchange solution and may be caused to re-enter the vessel 10a adjacent the bottom thereof. Each of these pipes may be provided with a venturi steam ejector 51 so that the base exchange solution may be withdrawn from the top of the vessel and reinjected under steam pressure adjacent the bottom of the vessel. In this way, recirculation under pressure can be brought about without moving parts. Suitable valves may be provided in the venturi ejectors to prevent leakage of base exchange solution from the ejectors while the vessels are being filled or while the ejectors are not in use.

Figure 3 is an embodiment of pressure vessel similar to Fig. 2 in which a rotary pump 51a is used in place of the venturi steam ejectors 51 to provide for recirculation of the base exchange solution through each pressure vessel. In the vessels illustrated in Figures 2 and 3, it will be understood that steam jackets such as 45 and other parts illustrated in Figure 1 may be provided.

By suitably regulating the rate of recirculation and the size of the solid particles in the vessels, the base exchange solution can be caused to flow upward through a substantially stationary bed of solid particles or the liquid flow can be such as to maintain the solid particles in a teeter balance or a fluidized state of mild ebullition.

Referring now to Fig. 4, which shows a vessel 10 or 10a in-line, it may be assumed for the purpose of illustration that this vessel occupies any intermediate position in the line between first and last, the net flow of base exchange liquor being in the direction of the arrows at valves 15 and 41. When the vessel 10 is in this intermediate position, the following valves are open, 15, 37, 37', 41, 41', and the following are closed, 31, 38, 39, 40, 42, 43.

When the vessel 10 is last on the line, that is, it contains the most spent wyomingite and is receiving the fresh sodium base exchange liquor and is about to be taken off the line, the following valves are open, 15, 37', 39, 41, 41', and the following are closed, 31, 37, 38, 40, 42, 43.

When the vessel 10 is taken off-line, it is merely by-passed by closing valves 37' and 41 and manipulating the next set of valves in the series so that the next vessel on the right becomes the last in the line, and the next vessel on the left, the first on the line.

When the vessel 10 is first on-line and has been filled with fresh wyomingite, the following valves are open, 15, 37, 37', 41, 42, and the following valves are closed, 38, 39, 40, 41', 43. This means that high pressure liquor is being withdrawn through valve 42 during half the time, more or less, and the next vessel on the right is off-line and is being processed for refilling with fresh wyomingite.

It will be noted that the pumps 16, 51 and 51a furnish all of the energy for causing the liquor to flow upwardly through the bed, and that a small additional pressure drop only is required to cause the net flow to pass from one vessel to the next, as this corresponds only to the friction in passing through the connecting pipes. This will be automatically taken care of by the pressure in steam spaces 28 at the tops of the vessels, which will become adjusted to be successively slightly less in each succeeding vessel going from last to first.

It will be understood that valves 38 and 42, which are the take-off valves for finished liquor, will be provided with suitable well-known back pressure maintaining devices which must maintain back pressure of about 225 p. s. i. when liquor is flowing, and also when steam and/or gas is being forced out during the period when the first vessel is being filled with liquor. It will be noted that a considerable amount of heat may be removed by passing the liquor and steam into a blow-down tank at a lower pressure, from which the steam may be removed for reuse in heating fresh base exchange liquor.

Valves 33 and wash water valves 34 are manipulated when the vessel is off-line, as described. A suitable by-pass to the blow-down tank 32 is indicated at 15'.

The operation of the method and apparatus is as follows, after the oncoming base exchange solution has flowed through the series of vessels from the last in line to the first in line into which fresh wyomingite has just been charged, a finished liquor relatively high in content of potassium and correspondingly low in sodium content is recovered for a predetermined time from the vessel first in line, when this vessel becomes second in the line, and so on until the same vessel becomes last in the line, and is treated with the fresh sodium solution for the same predetermined time, thus removing substantially all of the exchangeable potassium from the leucitic content of the wyomingite. At this time the last vessel is isolated from the line by valve manipulation, the sodium bearing liquor is recovered, and the analcite tails washed before discarding. This last vessel is then filled with fresh wyomingite and is put on the line, becoming again the first vessel.

The flow of oncoming liquor is then directed from the last vessel through the intermediate vessels and into the first vessel, and the rate of flow is preferably so determined that the first vessel becomes filled with liquor in about half the predetermined time for switching vessels from one stage in-line to the next. This period may be one hour, requiring that the rate of flow be such as to fill the first vessel in half an hour. The consequence of this is that although the flow of sodium base exchange liquor into the last vessel and so on through the line and into the first vessel is continuous, half the time is required to fill the vessel in first position, so that the system is actually producing finished potassium liquor during only about half the time. As all of the net potassium must be produced in half the time of flow, this requirement doubles the concentration which will be derived from idealized calculations, assuming continuous flow, and this in turn necessitates about double the concentration of the sodium in the fresh base exchange liquor in order to achieve the necessary double concentration of potassium in the finished liquor. This necessarily follows from the laws of base exchange which are based upon relative concentration of sodium and potassium, the former necessarily always being in excess. These novel consequences of the carrying out of my system are described numerically in the examples given below.

Thus, in the entire series of stages which may be nine or seven, more or less, a given vessel is only filled once and dumped once, the flow of liquor being continuously through the system and the potassium being removed by base exchange from the solids in the intermediate vessels by percolation through the beds.

*Example 1*

This refers to a quiescent bed of larger particles with about 45 per cent voids, which make up the beds 17 in the vessel 10. A representative range of particle sizes follows:

| Particle Size | Unscreened | Screened to Remove −48 Mesh |
|---|---|---|
| −¾ +½ | 5.9 | 6.6 |
| −½ +⅜ | 4.2 | 4.7 |
| −⅜ +3 | 7.1 | 8.0 |
| −3 +4 | 9.9 | 11.2 |
| −4 +6 | 9.1 | 10.3 |
| −6 +10 | 26.9 | 30.2 |
| −10 +14 | 8.2 | 9.3 |
| −14 +20 | 7.1 | 8.0 |
| −20 +28 | 4.7 | 5.3 |
| −28 +35 | 3.8 | 4.3 |
| −35 +48 | 1.9 | 2.1 |
| −48 +65 | 1.4 | |
| −65 +100 | 4.2 | |
| −100 +150 | .4 | |
| −150 +200 | .9 | |
| −200 | 4.3 | |

In this table the second column refers to the material which has not been screened, but is as received after being crushed in an Allis-Chalmers pulverator or equivalent crushing machine. The third column which refers to screened material is after removing 11.2 per cent of the total as −48 mesh material. I prefer to use the screened wyomingite because by so doing I may employ a velocity through the particles induced by pumps 16, 51, and 51a of as high as 2 ft. per minute without picking up particles of wyomingite in the suction of pump 16. This velocity compares with a velocity of about .44 ft. per minute for the net flow of liquor through the line. (This is on the basis of the water contained, and applies to the gross area of the cross section.) Such a higher velocity, which can only be induced by the recirculation by means of pumps is of great assistance in promoting base exchange. The net flow of liquor through the line corresponds to about 133 G. P. M. basis contained water, whereas the flow through the pumps may be as high as 600 G. P. M.

In referring to equipment sizes, I shall state these for the production of 46,500 tons potassium as K₂O annually. This will require approximately three independent lines of vessels of ten vessels, each when producing a finished liquor from the first vessel with a weight ratio of potassium/sodium of about 6.75. The inside diameter of the wyomingite holding space is about 7' 9" and the overall height of each vessel is about 25'. In this example, the lbs. of potassium per 100 lbs. of water in the finished liquor issuing from the first vessel is about ten and of sodium, about 1.47. The base exchange solution entering the last vessel contains about 7.36 lbs. sodium per 100 lbs. water.

*Example 2*

This refers to a condition in which the bed of wyomingite 17 is in teeter equilibrium with the upward flowing liquor and contains about 60 per cent voids.

In this case the wyomingite may be ground in a ball mill to get the following screen analysis:

| Screen Size | Unscreened | Screened to Remove −65 Mesh |
|---|---|---|
| −10 +14 | 7.56 | 11.95 |
| −14 +28 | 27.03 | 42.75 |
| −28 +35 | 12.15 | 19.2 |
| −35 +48 | 8.72 | 13.8 |
| −48 +65 | 7.75 | 12.3 |
| −65 +100 | 5.39 | |
| −100 +150 | 5.57 | |
| −150 +200 | 5.15 | |
| −200 | 20.68 | |

The second column in the above table shows the unscreened material and the third column, the material which is retained after screening out about 36.8 per cent of −65 mesh. I prefer to use the material of the third column in establishing teeter equilibrium with about 60 per cent voids. In this case, the upward flow through the particles, corresponding to the net advance of liquor, is .58 ft./min., corresponding to about 205 G. P. M. basis contained water. This velocity about corresponds theoretically to the condition for teeter equilibrium with 65 mesh particles, but as most of the particles are larger than 65 mesh, the pumps 16, 51 and 51a can be used to cause a velocity of upward flow of about 354 G. P. M., or a velocity of 1 ft./min. basis contained water.

The size of the base exchange vessel is only slightly larger for teeter equilibrium than for the quiescent bed of Example 1, but the number of vessels in-line may be reduced to seven.

In this Example 2, the lbs. potassium per 100 lbs. water in the finished liquor issuing from the first vessel is about 6.25 and the sodium, about .92. The base exchange solution entering the last vessel contains about 4.6 lbs. sodium per 100 lbs. water.

Because of the lower cost of grinding and the lesser portion of fine wyomingite to be discarded, or used elsewhere, and also because of the higher concentration of potassium in the finished liquor, I prefer to operate with the larger particles in a quiescent bed. A further advantage of the latter is that the remaining sodium liquor in the vessel off-line can more easily be drained off, and the washing of the deep bed in the off-line vessel is much easier than with smaller particles. When operating with teeter equilibrium, it is usually preferable to dump the entire charge from the vessel off-line and to separate and recover the sodium base exchange liquor from the analcite tails in separate equipment of well-known type.

I have disclosed herein a system and apparatus for continuous countercurrent base exchange wherein a base exchange solution is flowed upwardly through a series of substantially fixed deep beds of wyomingite particles or fragments which are large enough to permit relatively free flow of the base exchange solution therethrough and yet maintain the beds in substantially fixed position. Such beds are typified herein by so-called quiescent beds or by beds maintained in teeter equilibrium or balance by the upwardly flowing solution. Such substantially fixed beds are maintained in position by regulating the upward velocity of the base exchange solution through the beds in relation to the size of the particles or fragments so as to maintain good contact between the wyomingite and flowing solution without displacing the beds. The beds of this invention are to be contrasted with solid particles of wyomingite in linear motion or such solid particles under substantial agitation or turbulence.

While I have shown and described preferred forms of embodiment of my apparatus and a preferred method of operation, it will be understood that these drawings and descriptions are for purposes of illustration only and that various modifications and changes may be made in apparatus and methods described without departing from the spirit of this invention or the scope of the appended claims.

I claim:

1. A method of countercurrent in-line base exchange for removing potassium from wyomingite by base exchange with the sodium content of a base exchange liquor in a series of vessels holding beds of fragments of wyomingite which comprises filling the first vessel with fresh fragments of wyomingite, filling this with oncoming base exchange liquor for about half of a predetermined period, withdrawing finished liquor during the other half, shifting the first vessel with part of its potassium removed to second position in-line after the predetermined period, and after a succession of such periods, shifting to the last vessel in-line in the series, continually introducing fresh base exchange liquor into the last vessel of the series containing sufficient sodium to be equivalent to the potassium withdrawn in the finished liquor and the sodium in the said liquor, flowing said liquor through the series from last to first by percolation through substantially fixed beds of fragments therein, the number of such vessels and the treatment conditions being such that the ratio of potassium to sodium in the said finished liquor is not less than about 6.8 to 1.0 maintaining said vessels under a temperature and pressure corresponding to about 225 pounds per square inch steam pressure, finally isolating the last vessels in turn from the series, separating and recovering the contained sodium base exchange liquor and discarding the wyomingite tails, one vessel being freshly filled and put on-line and one removed at each predetermined interval.

2. The method of extracting potash from wyomingite with a heated base exchange solution of a sodium salt, which comprises flowing the base exchange solution through substantially fixed beds of wyomingite fragments respectively maintained in a series of interconnected vessels maintained under heat and pressure so that the fresh base exchange solution flows first through the last vessel containing the most exhausted wyomingite and then through other vessels containing progressively less exhausted wyomingite to and through the first vessel in the series containing fresh wyomingite, periodically isolating the last vessel from the flow of base exchange solution, discharging the exhausted wyomingite from this vessel and filling it with fresh wyomingite, shifting the flow of base exchange solution so that the freshly charged vessel becomes the first vessel in the series, and recirculating the base exchange solution through the wyomingite in each vessel while the base exchange solution is flowing through the series of vessels.

3. The method of extracting potash from wyomingite by treatment in a series of base exchange vessels under heat and pressure which comprises treating all of the fresh wyomingite in the form of a substantially fixed bed of fragments in the first vessel of the series with a base exchange solution flowed upwardly through substantially fixed beds of wyomingite fragments from the last vessel in the series to the first vessel in the series whereby the base exchange solution is progressively impoverished in its exchange cations and enriched in its potassium ions and the base exchange solution progressively impoverished in exchange cations contacts wyomingite of progressively greater potassium content, periodically isolating the last vessel in the series containing the most exhausted wyomingite and discarding said wyomingite from said vessel, filling said vessel with fresh wyomingite and shifting the flow of base exchange solution so that said vessel becomes the first in the series and receives the base exchange solution which has flowed through all other base exchange vessels in the series.

4. The method of extracting potash from wyomingite with a heated base exchange solution of a sodium salt, which comprises flowing the base exchange solution through substantially fixed beds of wyomingite fragments respectively maintained in a series of interconnected vessels maintained under heat and pressure so that the fresh base exchange solution flows first through the last vessel containing the most exhausted wyomingite and then through other vessels containing progressively less exhausted wyomingite to and through the first vessel in the series containing fresh wyomingite, recirculating said solution through each vessel, periodically isolating the last vessel from the flow of base exchange solution, discharging the exhausted wyomingite from this vessel and filling it with fresh wyomingite, and shifting the flow of base exchange solution so that the freshly charged vessel becomes the first vessel in the series, flowing the base exchange solution into said first vessel containing fresh wyomingite for about one-half the period it takes to isolate, discharge and recharge a vessel without flowing base exchange solution from said first vessel and then flowing a concentrated potash solution from said first vessel containing a ratio of potassium to sodium in said base exchange solution of about 5 to 1.

References Cited in the file of this patent

UNITED STATES PATENTS

| Re. 18,393 | Pike et al. | Mar. 22, 1932 |
| 875,425 | Giflies | Dec. 31, 1907 |
| 1,211,828 | Dorr | Jan. 9, 1917 |
| 1,219,240 | Bucher et al. | Mar. 13, 1917 |
| 1,777,619 | Low | Oct. 7, 1930 |
| 1,792,220 | Green | Feb. 10, 1931 |
| 1,964,382 | Fleischer | June 26, 1934 |
| 2,165,935 | Menzel | July 11, 1939 |
| 2,310,986 | Murphy | Feb. 16, 1943 |
| 2,343,080 | Pike | Feb. 29, 1944 |
| 2,343,081 | Pike | Feb. 29, 1944 |
| 2,413,844 | Rawlings | Jan. 7, 1947 |
| 2,455,190 | Pike | Nov. 30, 1948 |
| 2,519,770 | Kramer | Aug. 22, 1950 |

FOREIGN PATENTS

| 109,077 | Great Britain | Aug. 27, 1917 |